United States Patent
Park et al.

(10) Patent No.: US 12,525,685 B2
(45) Date of Patent: Jan. 13, 2026

(54) SEPARATOR FOR LITHIUM SECONDARY BATTERY AND LITHIUM SECONDARY BATTERY INCLUDING THE SAME

(71) Applicant: LG ENERGY SOLUTION, LTD., Seoul (KR)

(72) Inventors: So-Jung Park, Daejeon (KR); Ji-Eun Kim, Daejeon (KR); So-Yeong Lee, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 628 days.

(21) Appl. No.: 17/921,285

(22) PCT Filed: Oct. 18, 2021

(86) PCT No.: PCT/KR2021/014521
§ 371 (c)(1),
(2) Date: Oct. 25, 2022

(87) PCT Pub. No.: WO2022/086100
PCT Pub. Date: Apr. 28, 2022

(65) Prior Publication Data
US 2023/0187780 A1    Jun. 15, 2023

(30) Foreign Application Priority Data
Oct. 19, 2020 (KR) .................. 10-2020-0135019

(51) Int. Cl.
*H01M 50/446* (2021.01)
*H01M 10/052* (2010.01)
(Continued)

(52) U.S. Cl.
CPC ....... *H01M 50/446* (2021.01); *H01M 10/052* (2013.01); *H01M 50/42* (2021.01); *H01M 50/426* (2021.01); *H01M 50/457* (2021.01)

(58) Field of Classification Search
CPC . H01M 50/449; H01M 50/451; H01M 50/457
See application file for complete search history.

(56) References Cited

U.S. PATENT DOCUMENTS

| 6,432,586 | B1 | 8/2002 | Zhang |
| 2001/0005563 | A1 | 6/2001 | Yamamoto et al. |

(Continued)

FOREIGN PATENT DOCUMENTS

| CN | 1325145 A | 12/2001 |
| CN | 103904276 A | 7/2014 |

(Continued)

OTHER PUBLICATIONS

International Search Report for PCT/KR2021/014521 mailed on Jan. 24, 2022.

(Continued)

*Primary Examiner* — Stephan J Essex
(74) *Attorney, Agent, or Firm* — Birch, Stewart, Kolasch & Birch, LLP (57) ABSTRACT

A separator for a lithium secondary battery and a lithium secondary battery including the separator, where the separator includes a porous polymer substrate; and a porous coating layer on at least one surface of the porous polymer substrate. The porous coating layer includes inorganic particles having a Mohs hardness of 3.5 to 8.5 and a binder polymer. The binder polymer includes a first binder polymer having a storage modulus at 70° C. of 500 Mpa or more. The separator shows excellent compression resistance.

12 Claims, 3 Drawing Sheets

(51) Int. Cl.
 H01M 50/42 (2021.01)
 H01M 50/426 (2021.01)
 H01M 50/457 (2021.01)

(56) References Cited

U.S. PATENT DOCUMENTS

| | | |
|---|---|---|
| 2014/0308565 A1 | 10/2014 | Lee et al. |
| 2015/0280197 A1 | 10/2015 | Zhao et al. |
| 2015/0303003 A1* | 10/2015 | Ha ............... H01M 50/451 |
| | | 136/252 |
| 2016/0141579 A1 | 5/2016 | Seok et al. |
| 2016/0164060 A1 | 6/2016 | Zhang et al. |
| 2016/0197327 A1 | 7/2016 | Li et al. |
| 2018/0034025 A1 | 2/2018 | Lee et al. |
| 2020/0350546 A1 | 11/2020 | Sung et al. |
| 2021/0376319 A1 | 12/2021 | Shinoda et al. |

FOREIGN PATENT DOCUMENTS

| | | |
|---|---|---|
| CN | 105070867 A | 11/2015 |
| CN | 109661736 A | 4/2019 |
| JP | 2001-181435 A | 7/2001 |
| JP | 2010-67653 A | 3/2010 |
| JP | 2011-171290 A | 9/2011 |
| JP | 5802513 B2 | 10/2015 |
| JP | 2016-183209 A | 10/2016 |
| JP | 2017-139117 A | 8/2017 |
| JP | 2017-162803 A | 9/2017 |
| JP | 2020-57606 A | 4/2020 |
| KR | 10-0537303 B1 | 7/2006 |
| KR | 10-2014-0124322 A | 10/2014 |
| KR | 10-2016-0059856 A | 5/2016 |
| KR | 10-2016-0129762 A | 11/2016 |
| KR | 10-2016-0132597 A | 11/2016 |
| KR | 10-2018-0075471 A | 7/2018 |
| KR | 10-2020-0051370 A | 5/2020 |
| WO | WO 2014/175050 A1 | 10/2014 |
| WO | WO 2017/026485 A1 | 2/2017 |
| WO | WO 2020/096310 A1 | 5/2020 |
| WO | WO2020/171661 A1 | 8/2020 |

OTHER PUBLICATIONS

Kang et al., "Physical Properties of Poly(lactic acid)/Cellulose Nanocrystal Nanocomposites", Polymer(Korea), 2018, vol. 42, No. 4, pp. 649-653.

Shojaei et al., "Temperature and frequency-dependent creep and recovery studies on PVDF-HFP/organo-modified layered double hydroxides nanocomposites", Journal of Applied Polymer Science, 2018, vol. 135, No. 23, 46352, total 15 pages.

Extended European Search Report for European Application No. 21883169.1, dated Jul. 4, 2024.

* cited by examiner

SEPARATOR FOR LITHIUM SECONDARY BATTERY AND LITHIUM SECONDARY BATTERY INCLUDING THE SAME

TECHNICAL FIELD

The present application claims priority to Korean Patent Application No. 10-2020-0135019 filed on Oct. 19, 2020 in the Republic of Korea.

The present disclosure relates to a separator for a lithium secondary battery and a lithium secondary battery including the same.

BACKGROUND ART

Recently, energy storage technology has been given an increasing attention. As the application of energy storage technology has been extended to energy for cellular phones, camcorders and notebook PC and even to energy for electric vehicles, there has been an increasing need for providing batteries used as power sources for such electronic devices with high energy density. Lithium secondary batteries are those satisfying such a need best. Therefore, active studies have been conducted about such lithium secondary batteries.

In general, such a lithium secondary battery includes a positive electrode including a positive electrode active material, a negative electrode including a negative electrode active material, a non-aqueous electrolyte containing a lithium salt and an organic solvent, and a separator interposed between the positive electrode and the negative electrode so that both electrodes may be insulated electrically from each other.

Herein, when the separator and electrodes are laminated in order to manufacture a lithium secondary battery, the separator may be compressed locally by heat and pressure. In addition, the separator may be compressed locally due to volumetric swelling caused by repetition of charge/discharge cycles. Then, lithium dendrite may be formed at such a locally compressed portion, resulting in an internal short-circuit.

Particularly, use of metal oxide for a negative electrode, instead of graphite, has been increased recently in order to increase the energy density of a lithium secondary battery. Such a metal oxide has high hardness so that the problems caused by the compression of a separator may become severe.

In addition, in the case of a separator including a polyolefin-based porous substrate and a porous coating layer formed on at least one surface of the porous substrate and including inorganic particles and a binder polymer used currently as a separator, the porous polymer substrate may be compressed locally due to the inorganic particles. When the porous coating layer itself is compressed by heat and pressure, some problems, including an increase in resistance caused by blocking of the pores in the porous coating layer, may occur.

Therefore, there is an imminent need for a separator which can absorb external stress applied thereto and shows excellent compression resistance.

DISCLOSURE

Technical Problem

The present disclosure is designed to solve the problems of the related art, and therefore the present disclosure is directed to providing a separator for a lithium secondary battery having excellent compression resistance and a lithium secondary battery including the same.

Technical Solution

In one aspect of the present disclosure, there is provided a separator for a lithium secondary battery according to any one of the following embodiments.

According to the first embodiment, there is provided a separator for a lithium secondary battery, including:
  a porous polymer substrate; and
  a porous coating layer on at least one surface of the porous polymer substrate, wherein the porous coating layer includes inorganic particles having a Mohs hardness of 3.5 to 8.5 and a binder polymer,
  wherein the binder polymer includes a first binder polymer having a storage modulus at 70° C. of 500 Mpa or more.

According to the second embodiment, there is provided the separator for a lithium secondary battery as defined in the first embodiment, wherein the inorganic particles may include $TiO_2$, $SiO_2$, or two or more of them.

According to the third embodiment, there is provided the separator for a lithium secondary battery as defined in the first or the second embodiment, wherein the first binder polymer may include polyvinylidene fluoride-co-hexafluoropropylene containing hexafluoropropylene (HFP) monomers at 1 wt % to 3 wt %, poly(acrylic acid)-co-poly(vinyl alcohol), or two or more of them.

According to the fourth embodiment, there is provided the separator for a lithium secondary battery as defined in any one of the first to the third embodiments, wherein the binder polymer may further include a second binder polymer having a storage modulus at 70° C. of 50 Mpa or less.

According to the fifth embodiment, there is provided the separator for a lithium secondary battery as defined in the fourth embodiment, wherein the weight ratio of the first binder polymer to the second binder polymer is 0.8:1 to 1.2:1.

According to the sixth embodiment, there is provided the separator for a lithium secondary battery as defined in the fourth or the fifth embodiment, wherein the second binder polymer may include polyvinylidene fluoride-co-trichloroethylene, polyvinylidene fluoride-co-chlorotrifluoroethylene, polymethyl methacrylate, polyacrylonitrile, polyvinyl pyrrolidone, polyvinyl acetate, polyvinyl alcohol, polyethylene-co-vinyl acetate, polyethylene oxide, cellulose acetate, cellulose acetate butyrate, cellulose acetate propionate, cyanoethyl pullulan, cyanoethyl polyvinylalchol, cyanoethyl cellulose, cyanoethyl sucrose, pullulan, carboxymethyl cellulose, acrylonitrile-styrene-butadiene copolymer, polyimide, or two or more of them.

According to the seventh embodiment, there is provided the separator for a lithium secondary battery as defined in any one of the first to the sixth embodiments, wherein the separator may have a decrease in thickness of 7% or less under a condition of lamination of electrodes with the separator.

According to the eighth embodiment, there is provided the separator for a lithium secondary battery as defined in any one of the first to the seventh embodiments, wherein the porous coating layer may further include a dispersant.

According to the ninth embodiment, there is provided the separator for a lithium secondary battery as defined in the eighth embodiment, wherein the dispersant may include a cyano (CN) group-containing cyano resin, carboxymethyl cellulose (CMC), polyacrylic acid (PAA), polymethacryl acrylate (PMAA), or two or more of them.

According to the tenth embodiment, there is provided the separator for a lithium secondary battery as defined in any one of the first to the ninth embodiments, wherein the inorganic particles may be present in an amount of 20 wt % to 99.9 wt % based on 100 wt % of the porous coating layer.

In another aspect of the present disclosure, there is provided a lithium secondary battery according to the following embodiment.

According to the eleventh embodiment, there is provided a lithium secondary battery including a positive electrode, a negative electrode and a separator interposed between the positive electrode and the negative electrode, wherein the separator is the separator for a lithium secondary battery as defined in any one of the first to the tenth embodiments.

Advantageous Effects

The separator for a lithium secondary battery according to an embodiment of the present disclosure includes inorganic particles having a Mohs hardness of 3.5-8.5 and a first binder polymer having a storage modulus at 70° C. of 500 MPa or more so that the porous coating layer may absorb the external stress applied to the separator, while preventing the porous polymer substrate from being damaged, and thus can provide excellent compression resistance.

In addition, the separator for a lithium secondary battery according to an embodiment of the present disclosure can prevent the porous coating layer from being compressed by the external pressure, and thus can provide improved air permeability.

Particularly, the separator for a lithium secondary battery according to an embodiment of the present disclosure may show a decrease in thickness of the separator, particularly, a decrease in thickness of the porous polymer substrate contained in the separator, of 7% or less, under a condition of lamination of electrodes with the separator.

The separator for a lithium secondary battery according to an embodiment of the present disclosure minimizes compression of the separator caused by external stress to provide improve cycle life and to overcome the problem of an internal short-circuit.

The separator for a lithium secondary battery according to an embodiment of the present disclosure may further include a second binder polymer having a storage modulus at 70° C. of 50 MPa or less, besides the first binder polymer having a storage modulus at 70° C. of 500 MPa or more, and thus can provide excellent adhesion to an electrode, while providing excellent compression resistance and improved air permeability.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In one aspect of the present disclosure, there is provided a separator for a lithium secondary battery, including:
 a porous polymer substrate; and
 a porous coating layer disposed on at least one surface of the porous polymer substrate, and including inorganic particles having a Mohs hardness of 3.5-8.5 and a binder polymer,
 wherein the binder polymer includes a first binder polymer having a storage modulus at 70° C. of 500 Mpa or more.

According to an embodiment of the present disclosure, the porous polymer substrate is not particularly limited, as long as it may be used generally as a material for a separator for a lithium secondary battery. The porous polymer substrate may be a thin film including a polymeric material, and non-limiting examples of such a polymeric material include at least one selected from polymer resins, such as polyolefin resin, polyethylene terephthalate, polybutylene terephthalate, polyacetal, polyamide, polycarbonate, polyimide, polyetherether ketone, polyether sulfone, polyphenylene oxide, polyphenylene sulfide, and polyethylene naphthalene. In addition, the porous polymer substrate may include a non-woven web or a porous polymer film made of such a polymeric material, or a laminate of two or more layers thereof.

Particularly, the porous polymer substrate may be any one of the following a) to e):
 a) A porous film formed by melting and extruding a polymer resin;
 b) A multilayer film formed by stacking two or more layers of the porous films of a);
 c) A non-woven web formed by integrating filaments obtained by melting/spinning a polymer resin;
 d) A multilayer film formed by stacking two or more layers of the non-woven webs of c); and
 e) A porous composite film having a multilayer structure including two or more of a) to d).

According to an embodiment of the present disclosure, the porous polymer substrate may have a thickness of 5-50 µm. The thickness of the porous polymer substrate is not particularly limited to the above-defined range. However, when the porous polymer substrate satisfies the above-defined range of thickness, it is easier to ensure energy density, while preventing the separator from being damaged easily during the use of a battery. Meanwhile, although there is no particular limitation in the pore size and porosity of the porous polymer substrate, the pore size and porosity may be 0.01-50 μm and 10-95%, respectively.

According to the present disclosure, the porosity and pore size of the porous polymer substrate may be determined from scanning electron microscopic (SEM) images, by using a mercury porosimeter or capillary flow porosimeter, or through the BET6-point method based on nitrogen gas adsorption flow using a porosimetry analyzer (e.g. Belsorp-II mini, Bell Japan Inc.). Herein, it may be advantageous to use a capillary flow porosimeter.

In the separator for a lithium secondary battery according to an embodiment of the present disclosure, the porous coating layer is disposed on at least one surface of the porous polymer substrate. For example, the porous coating layer may be disposed on one surface or both surfaces of the porous polymer substrate.

In the separator for a lithium secondary battery according to an embodiment of the present disclosure, the porous coating layer includes inorganic particles having a Mohs hardness of 3.5-8.5, and a binder polymer (not shown) with which the inorganic particles (not shown) are attached to one another (i.e. the binder polymer connects the inorganic particles among themselves and fixes them) so that they may retain their binding states. The porous coating layer prevents the porous polymer substrate from undergoing severe heat shrinking at high temperature by virtue of the inorganic particles, thereby providing the separator with improved safety.

According to the present disclosure, the binder polymer includes a first binder polymer having a storage modulus at 70° C. of 500 Mpa or more. As used herein, 'storage modulus' means an extent of elastic energy accumulated in a vibrating sample.

The separator for a lithium secondary battery according to an embodiment of the present disclosure allows the porous coating layer containing the first binder to absorb the external stress applied to the separator, thereby preventing compression of the separator, while providing the separator with improved air permeability, by using the first binder polymer having a storage modulus at 70° C. of 500 Mpa or more.

Meanwhile, when a lithium secondary battery including a stack of a separator with electrodes is manufactured by laminating the separator with the electrodes generally at 60-70° C. under a pressure of 2.4-3.2 kgf/mm, the separator may be compressed locally by the heat and pressure applied during the lamination.

The separator for a lithium secondary battery according to an embodiment of the present disclosure includes the first binder polymer having a high storage modulus under such a lamination temperature condition, and thus can show excellent compression resistance against the heat and pressure applied to the separator during the lamination.

According to the present disclosure, the storage modulus at 70° C. of the binder polymer may be determined by using dynamic mechanical analysis (DMA).

According to an embodiment of the present disclosure, the separator, particularly, the porous polymer substrate, may show a decrease in thickness of 7% or less at a temperature range of lamination of the separator with electrodes. When the porous polymer substrate satisfies the above-defined range of a decrease in thickness at a temperature range of lamination of the separator with electrodes, it is easier to prevent an increase in internal short-circuit defects caused by local deformation of the porous polymer substrate. Since the separator for a lithium secondary battery according to an embodiment of the present disclosure shows a decrease in thickness of 7% or less at a temperature range of lamination of the separator with electrodes, it is possible to minimize damages upon the separator, and thus to improve the performance of a lithium secondary battery that may be affected by the thickness of the separator.

Herein, a decrease in thickness under the condition of lamination of the separator with electrodes may be determined by compressing the separator with a hot press at 70° C. under a pressure of 7.4 MPa, and then measuring the thickness of the separator, for example, the porous polymer substrate.

Particularly, a decrease in thickness may be calculated according to the following formula.

Decrease in thickness of porous polymer substrate at 70° C. under 7.4 MPa=(Initial thickness of porous polymer substrate−Thickness of porous polymer substrate at 70° C. under 7.4 MPa)/ Initial thickness of porous polymer substrate When the first binder polymer has a storage modulus at 70° C. of less than 500 MPa, the porous coating layer cannot absorb the external stress applied to the separator sufficiently. Therefore, the external stress is transferred directly to the porous polymer substrate to cause deformation of the separator, resulting in an increase in internal short-circuit defects. In this case, the porous polymer substrate may show a decrease in thickness of larger than 7%.

In addition, the separator for a lithium secondary battery according to an embodiment of the present disclosure may have an air permeability of less than 2000 s/100 cc at a temperature range of lamination of the separator with electrodes. When the separator has an air permeability of less than 2000 s/100 cc, it is easier to further improve the output and cycle life characteristics of a battery.

The air permeability of the separator may be determined by measuring a time, i.e. air permeation time, required for 100 cc of air to pass through the 1 in$^2$ section of the separator under a pressure of 12.2 inH$_2$O.

According to an embodiment of the present disclosure, the first binder polymer may include polyvinylidene fluoride-co-hexafluoropropylene containing hexafluoropropylene (HFP) monomers at 1-3 wt %, poly(acrylic acid)-co-poly(vinyl alcohol), or two or more of them.

According to an embodiment of the present disclosure, the binder polymer may further include a second binder polymer having a storage modulus at 70° C. of 50 Mpa or less, in addition to the first binder polymer. The second binder polymer has a storage modulus at 70° C. of 50 Mpa or less, but may contribute to improvement of adhesion of the separator to an electrode.

According to an embodiment of the present disclosure, when the binder polymer further includes the second binder polymer, in addition to the first binder polymer, distribution of the first binder polymer and the second binder polymer in the porous coating layer is not limited to what is described below, but the first binder polymer may be disposed predominantly in the surface portion of the porous coating layer as compared to the second binder polymer (the first binder polymer may be disposed herein at a higher proportion as compared to the weight ratio of the first binder polymer and the second binder polymer upon the initial introduction). On the contrary, the second binder polymer may be present throughout the thickness direction of the porous coating layer and/or may be disposed predominantly at the interface portion between the porous coating layer and the porous polymer substrate as compared to the first binder polymer (the second binder polymer may be disposed herein at a higher proportion as compared to the weight ratio of the first binder polymer and the second binder polymer upon the initial introduction).

Herein, the first binder polymer may contribute to the adhesion to an electrode in the surface portion of the porous coating layer, and the second binder polymer may contribute to improvement of the adhesion between the porous polymer substrate and the porous coating layer. In this manner, it is possible to provide a separator having excellent adhesion to an electrode as well as excellent adhesion between the porous coating layer and the porous polymer substrate. As a result, the separator may have excellent compression resistance, improved air permeability and excellent adhesion to an electrode.

According to an embodiment of the present disclosure, the weight ratio of the first binder polymer to the second binder polymer may be 0.8:1-1.2:1, 0.9:1-1.1:1, or about 1:1. When the weight ratio of the first binder polymer to the second binder polymer satisfies the above-defined range, the separator may have excellent compression resistance, improved air permeability and excellent adhesion to an electrode.

According to an embodiment of the present disclosure, the second binder polymer may include polyvinylidene fluoride-co-trichloroethylene, polyvinylidene fluoride-co-chlorotrifluoroethylene, polymethyl methacrylate, polyacrylonitrile, polyvinyl pyrrolidone, polyvinyl acetate, polyvinyl alcohol, polyethylene-co-vinyl acetate, polyethylene oxide, cellulose acetate, cellulose acetate butyrate, cellulose acetate propionate, cyanoethyl pullulan, cyanoethyl polyvinylalchol, cyanoethyl cellulose, cyanoethyl sucrose, pullulan, carboxymethyl cellulose, acrylonitrile-styrene-butadiene copolymer, polyimide, or two or more of them.

The separator for a lithium secondary battery according to an embodiment of the present disclosure includes inorganic particles having a Mohs hardness of 3.5-8.5 in combination with the first binder polymer having a storage modulus of 500 MPa or more at 70° C. Since the separator for a lithium secondary battery according to an embodiment of the present disclosure includes inorganic particles having a Mohs hardness of 3.5-8.5 in combination with the first binder polymer having a storage modulus of 500 MPa or more at 70° C., the inorganic particles and the first binder polymer absorb the external stress to prevent the porous coating layer from being compressed by the external stress, while preventing the porous polymer substrate from being damaged by the porous coating layer.

As used herein, the term 'Mohs hardness' refers to a value of hardness evaluated by comparing the hardness of a material to those of 10 types of minerals as standard materials (Mohs hardness 1: talc, Mohs hardness 2: gypsum, Mohs hardness 3: calcite, Mohs hardness 4: fluorite, Mohs hardness 5: apatite, Mohs hardness 6: orthoclase, Mohs hardness 7: quartz, Mohs hardness 8: topaz, Mohs hardness 9: corundum, and Mohs hardness 10: diamond). When rubbing a sample against a standard material and then generating scratches, the sample is judged to have a lower hardness.

When the inorganic particles have a Mohs hardness of less than 3.5, it is possible to prevent the porous polymer substrate from being damaged by the Mohs hardness of the inorganic particles, but the inorganic particles cannot absorb the external stress sufficiently. Therefore, even though the separator includes the first binder polymer as described below, the separator, particularly the porous polymer substrate may cause problems resulting from its compression. In addition, the inorganic particles cannot absorb the external stress sufficiently so that the porous coating layer itself is compressed by the external stress, resulting in blocking of the pores of the porous coating layer. As a result, the separator may show decreased air permeability.

When the inorganic particles have a Mohs hardness of larger than 8.5, the porous coating layer containing the inorganic particles and the first binder polymer as described below can absorb the external stress, but such an excessively high Mohs hardness of the inorganic particles rather applies stress to the porous polymer substrate so that the porous polymer substrate may be damaged, resulting in problems caused by compression of the porous polymer substrate.

According to an embodiment of the present disclosure, the inorganic particles may have a Mohs hardness of 4.0-8.0, 5.0-7.5, or 7.0-7.5.

According to an embodiment of the present disclosure, particular examples of the inorganic particles having a Mohs hardness of 3.5-8.5 may include $TiO_2$, $SiO_2$, or two or more of them.

According to an embodiment of the present disclosure, the inorganic particles are not particularly limited in size, but may have an average particle diameter of about 0.01-10 μm, or 0.05-1.0 μm. When the inorganic particles satisfy the above-defined range of size, they maintain dispersibility so that the physical properties of the separator may be controlled with ease, and the mechanical properties of the separator may be improved. In addition, it is easier to reduce the possibility of an internal short-circuit during charge/discharge, caused by an excessively large pore size.

As used herein, the term 'average particle diameter of the inorganic particles' means a D50 particle diameter, and 'D50 particle diameter' means a particle diameter at a point of 50% in the accumulated particle number distribution depending on particle diameter. The particle diameter may be determined by using a laser diffraction method. Particularly, powder to be analyzed is dispersed in a dispersion medium and introduced to a commercially available laser diffraction particle size analyzer (e.g. Microtrac S3500), and then a difference in diffraction pattern depending on particle size is determined, when particles pass through laser beams, and then particle size distribution is calculated. Then, the particle diameter at a point of 50% of the particle number accumulated distribution depending on particle diameter is calculated to determine D50.

According to an embodiment of the present disclosure, the inorganic particles may be present in an amount of 20-99.9 wt % based on 100 wt % of the porous coating layer.

According to an embodiment of the present disclosure, the porous coating layer may further include other additives used conventionally in the art, in addition to the inorganic particles, the first binder polymer and the second binder polymer.

According to an embodiment of the present disclosure, the porous coating layer may further include a dispersant. Particular examples of the dispersant may include cyano (CN) group-containing cyano resin, carboxymethyl cellulose (CMC), polyacrylic acid (PAA), polymethacryl acrylate (PMAA), or two or more of them. When the porous coating layer further includes a dispersant, it is possible to further improve the dispersibility of the inorganic particles.

According to an embodiment of the present disclosure, the dispersant may be used in an amount of 0.5-2.0 wt %, 1.0-1.7 wt %, or about 1.5 wt %, based on 100 wt % of the porous coating layer. When the content of the dispersant satisfies the above-defined range, it is easier to prevent aggregation of the inorganic particles in the porous coating layer and to facilitate homogeneous dispersion of the inorganic particles.

According to an embodiment of the present disclosure, in the porous coating layer, the inorganic particles may be bound to one another by the binder polymer, while they may be packed and are in contact with one another, thereby forming interstitial volumes among the inorganic particles, and the interstitial volumes among the inorganic particles may become vacant spaces to form pores.

According to an embodiment of the present disclosure, the porous coating layer may have a pore size of 0.001-10 pm, or 0.001-1 pm. In addition, the porous coating layer may have a porosity of 5-95%, 10-95%, 20-90%, or 30-80%. The porosity corresponds to a value obtained by subtracting the volume expressed from the weight and density of each ingredient in the porous coating layer, from the volume calculated from the thickness, width and length of the porous coating layer.

According to the present disclosure, the porosity and pore size of the porous coating layer may be determined from scanning electron microscopic (SEM) images, by using a mercury porosimeter or capillary flow porosimeter, or through the BET6-point method based on nitrogen gas adsorption flow using a porosimetry analyzer (e.g. Belsorp-II mini, Bell Japan Inc.). Herein, it is advantageous to use a capillary flow porosimeter.

According to an embodiment of the present disclosure, the porous coating layer may have a thickness of 1-50 µm, 2-30 µm, or 2-20 µm.

The separator for a lithium secondary battery according to an embodiment of the present disclosure may be manufactured by the method as described hereinafter, but is not limited thereto.

The method for manufacturing a separator for a lithium secondary battery according to an embodiment of the present disclosure includes the steps of:

preparing a porous polymer substrate; and coating slurry including inorganic particles, a binder polymer and a solvent for the binder polymer onto at least one surface of the porous polymer substrate, followed by drying, to form a porous coating layer, wherein the binder polymer includes a first binder polymer having a storage modulus at 70° C. of 500 Mpa or more.

Hereinafter, the method for manufacturing a separator for a lithium secondary battery according to an embodiment of the present disclosure will be described in more detail about the main parts thereof.

First, a porous polymer substrate is prepared. The porous polymer substrate is the same as described above, and may be obtained from the above-mentioned materials by forming pores through a conventional process known to those skilled in the art as a process for ensuring excellent air permeability and porosity, for example, a wet process using a solvent, a diluent or a pore-forming agent, or a dry process using orientation.

Next, slurry including inorganic particles, a binder polymer and a solvent for the binder polymer is coated onto at least one surface of the porous polymer substrate, followed by drying, to form a porous coating layer.

Reference will be made to the above description about the inorganic particles.

The binder polymer includes a first binder polymer having a storage modulus at 70° C. of 500 Mpa or more.

According to an embodiment of the present disclosure, the first binder polymer may include polyvinylidene fluoride-co-hexafluoropropylene containing hexafluoropropylene (HFP) monomers at 1-3 wt %, poly(acrylic acid)-co-poly(vinyl alcohol), or two or more of them.

According to an embodiment of the present disclosure, the binder polymer may further include a second binder polymer having a storage modulus at 70° C. of 50 Mpa or less, in addition to the first binder polymer. The second binder polymer has a storage modulus at 70° C. of 50 Mpa or less, but may contribute to improvement of the adhesion of the separator to an electrode.

Reference will be made to the above description about the weight ratio of the first binder polymer to the second binder polymer.

According to an embodiment of the present disclosure, the second binder polymer may include polyvinylidene fluoride-co-trichloroethylene, polyvinylidene fluoride-co-chlorotrifluoroethylene, polymethyl methacrylate, polyacrylonitrile, polyvinyl pyrrolidone, polyvinyl acetate, polyvinyl alcohol, polyethylene-co-vinyl acetate, polyethylene oxide, cellulose acetate, cellulose acetate butyrate, cellulose acetate propionate, cyanoethyl pullulan, cyanoethyl polyvinylalchol, cyanoethyl cellulose, cyanoethyl sucrose, pullulan, carboxymethyl cellulose, acrylonitrile-styrene-butadiene copolymer, polyimide, or two or more of them.

The solvent for the binder polymer may function as a solvent capable of dissolving the binder polymer, or as a dispersion medium not capable of dissolving the binder polymer but capable of dispersing the binder polymer, depending on the particular type of the binder polymer. Particularly, the solvent for the binder polymer may function as a solvent capable of dissolving the first binder polymer, or as a dispersion medium not capable of dissolving the first binder polymer but capable of dispersing the first binder polymer.

According to an embodiment of the present disclosure, when the binder polymer further includes a second binder polymer in addition to the first binder polymer, the solvent for the binder polymer may function as a solvent capable of dissolving both the first binder polymer and the second binder polymer, or as a dispersion medium not capable of dissolving both the first binder polymer and the second binder polymer but capable of dispersing both the first binder polymer and the second binder polymer.

According to an embodiment of the present disclosure, the solvent for the binder polymer may include acetone, dimethyl acetamide (DMAc), dimethyl formamide (DMF), tetrahydrofuran, methylene chloride (MC), chloroform, N-methyl-2-pyrrolidoen (NMP), cyclohexane, or two or more of them, but is not limited thereto.

According to an embodiment of the present disclosure, there is no particular limitation in the method for forming a porous coating layer by applying the slurry to at least one surface of the porous polymer substrate, and particular examples of the method include dip coating, die coating, roll coating, comma coating, doctor blade coating, reverse roll coating, direct roll coating, or the like.

Phase separation may be carried out to form a pore structure with higher quality in the porous coating layer. The term 'phase separation' means a process for forming a pore structure in the porous coating layer through a phase separation phenomenon known to those skilled in the art. For example, the phase separation may be performed by vapor induced phase separation or immersed phase separation.

Hereinafter, vapor induced phase separation will be explained in more detail.

Vapor induced phase separation refers to phase separation occurring when the porous polymer substrate coated with the slurry is exposed to a non-solvent atmosphere for the first binder polymer. Herein, the non-solvent may be introduced in a gaseous state.

Such vapor induced phase separation may be carried out at a temperature of 23-32° C. or 25-30° C. under a relative humidity of 40-60% or 50-55%. When the vapor induced phase separation is carried out at the above-defined range of temperature, it is easier to dry the porous coating layer within a short time, while ensuring a sufficient time required for the phase separation of the first binder polymer. When the vapor induced phase separation is carried out under the above-defined range of pressure, it is easier to prevent the problem of condensation of water in a drying furnace, while providing a non-solvent in an amount sufficient to carry out vapor induced phase separation.

According to an embodiment of the present disclosure, when the slurry further includes the second binder polymer in addition to the first binder polymer, vapor induced phase separation refers to phase separation occurring when the porous polymer substrate coated with the slurry is exposed to a non-solvent atmosphere for the first binder polymer and the second binder polymer. Herein, the non-solvent may be introduced in a gaseous state. Such vapor induced phase separation may be carried out at a temperature of 23-32° C. or 25-30° C. under a relative humidity of 45-60% or 50-55%. When the vapor induced phase separation is carried out at the above-defined range of temperature, it is easier to dry the porous coating layer within a short time, while ensuring a sufficient time required for the phase separation of the first binder polymer and the second binder polymer. When the vapor induced phase separation is carried out under the above-defined range of pressure, it is easier to prevent the problem of condensation of water in a drying furnace, while providing a non-solvent in an amount sufficient to carry out vapor induced phase separation.

Hereinafter, immersed phase separation will be explained in more detail.

The porous polymer substrate coated with the slurry is dipped in a coagulation solution containing a non-solvent for the first binder polymer for a predetermined time. During such dipping, the coated slurry becomes porous, while the first binder polymer is solidified. Then, the porous polymer substrate is washed with water to remove the coagulation solution, followed by drying. In the immersed phase separation, the non-solvent may be used in an amount of 60 wt % or more based on 100 wt % of the coagulation solution with a view to formation of a high-quality porous structure and improvement of productivity.

According to an embodiment of the present disclosure, when the slurry further includes the second binder polymer in addition to the first binder polymer, the porous polymer substrate coated with the slurry is dipped in a coagulation solution containing a non-solvent for the first binder polymer and the second binder polymer for a predetermined time. During such dipping, the coated slurry becomes porous, while the first binder polymer and the second binder polymer are solidified. Then, the porous polymer substrate is washed with water to remove the coagulation solution, followed by drying. In the immersed phase separation, the non-solvent may be used in an amount of 60 wt % or more based on 100 wt % of the coagulation solution with a view to formation of a high-quality porous structure and improvement of productivity.

The non-solvent is not particularly limited, as long as it cannot dissolve the first binder polymer but has partial compatibility with the solvent for the first binder polymer. According to an embodiment of the present disclosure, when the slurry further includes the second binder polymer in addition to the first binder polymer, the non-solvent may be one that cannot dissolve both the first binder polymer and the second binder polymer.

According to an embodiment of the present disclosure, the non-solvent for the binder polymer may include any one selected from the group consisting of methanol, ethanol, isopropyl alcohol, butanol, ethyl acetate and water, or two or more of them.

According to an embodiment of the present disclosure, when the slurry further includes the second binder polymer in addition to the first binder polymer, the first binder polymer may show a quicker phase separation behavior as compared to the second binder polymer under the phase separation condition during the formation of the porous coating layer, while the second binder polymer may show a slower phase separation behavior as compared to the first binder polymer under the phase separation condition during the formation of the porous coating layer. However, the scope of the present disclosure is not limited thereto.

In this case, the first binder polymer contained in the slurry may migrate toward the surface of the porous coating layer that is in contact with the non-solvent at a higher rate as compared to the second binder polymer. Finally, the first binder polymer may be disposed predominantly in the surface portion of the porous coating layer as compared to the second binder polymer (the first binder polymer may be disposed herein at a higher proportion as compared to the weight ratio of the first binder polymer and the second binder polymer upon the initial introduction). On the other hand, in the case of the second binder polymer, infiltration of the non-solvent may proceed more slowly as compared to the first binder polymer, and thus phase separation may be carried out at a lower rate. Therefore, the second binder polymer may be present throughout the porous coating layer in the thickness direction and/or may be disposed predominantly inside of the porous coating layer, i.e. between the porous polymer substrate and the inorganic particles, as compared to the first binder polymer (the second binder polymer may be disposed herein at a higher proportion as compared to the weight ratio of the first binder polymer and the second binder polymer upon the initial introduction).

According to an embodiment of the present disclosure, the first binder polymer and the second binder polymer may be used at the same time as binder polymers, wherein the second binder polymer may contribute to improvement of the adhesion between the porous polymer substrate and the porous coating layer, and the first binder polymer may contribute to improvement of the adhesion to an electrode at the surface portion of the porous coating layer. In this manner, it is easier to provide a separator having both excellent adhesion in the separator itself and excellent adhesion to an electrode.

According to an embodiment of the present disclosure, the drying may be carried out by using a process known to those skilled in the art, and may be performed in a batchwise or continuous mode by using an oven or a heating chamber in a temperature range considering the vapor pressure of the solvent used herein. The drying step is for substantially removing the solvent present in the composition, and is preferably carried out as rapidly as possible considering productivity, or the like. For example, the drying step may be carried out for 1 minute or less, or 30 seconds or less.

The separator for a lithium secondary battery according to an embodiment of the present disclosure may be interposed between a positive electrode and a negative electrode to provide a lithium secondary battery.

The lithium secondary battery including the separator for a lithium secondary battery according to an embodiment of the present disclosure can improve the problems, such as an increase in internal short-circuit defects caused by the compression of a separator and degradation of battery performance caused by the volumetric swelling of a negative electrode during charge/discharge, by using the separator having excellent compression resistance.

The lithium secondary battery may include a lithium metal secondary battery, a lithium-ion secondary battery, a lithium polymer secondary battery, a lithium-ion polymer secondary battery, or the like.

The electrodes used in combination with the separator according to the present disclosure are not particularly limited, and may be obtained by allowing electrode active materials to be bound to an electrode current collector through a method generally known in the art.

Among the electrode active materials, non-limiting examples of a positive electrode active material include conventional positive electrode active materials that may be used for the positive electrodes for conventional electrochemical devices. Particularly, lithium manganese oxides, lithium cobalt oxides, lithium nickel oxides, lithium iron oxides or lithium composite oxides containing a combination thereof are used preferably.

Non-limiting examples of a negative electrode active material include conventional negative electrode active materials that may be used for the negative electrodes for conventional electrochemical devices. Particularly, lithium-intercalating materials, such as lithium metal or lithium alloys, carbon, petroleum coke, activated carbon, graphite or other carbonaceous materials, are used preferably.

Non-limiting examples of a positive electrode current collector include foil made of aluminum, nickel or a combination thereof. Non-limiting examples of a negative electrode current collector include foil made of copper, gold, nickel, copper alloys or a combination thereof.

According to an embodiment of the present disclosure, the electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

According to an embodiment of the present disclosure, the separator for a lithium secondary battery may be applied to a battery through lamination, stacking and folding of the separator with electrodes, besides a conventional process, winding.

According to an embodiment of the present disclosure, the separator for a lithium secondary battery may be interposed between the positive electrode and the negative electrode. When an electrode assembly is formed by assembling a plurality of cells or electrodes, the separator may be interposed between the adjacent cells or electrodes. The electrode assembly may have various structures, such as a simple stack type, a jelly-roll type, a stacked-folded type, a laminated-stacked type, or the like.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLE 1-1

First, 28 wt % of poly(vinylidene fluoride-co-hexafluoropropylene) (available from Arkema, VDF monomer content:HFP monomer content=98:2) containing 2 wt % of hexafluoropropylene monomer and 98 wt % of vinylidene fluoride monomer, as the first binder polymer, and 2 wt % of cyano resin (Miwon commercial Co., Ltd.) as a dispersant were added to acetone.

Next, 70 wt % of $TiO_2$ (Sigma-Aldrich, average particle diameter: 500 nm, Mohs hardness: 7.3) was added thereto and dispersed therein by ball milling to prepare slurry for forming a porous coating layer.

The prepared slurry was coated on both surfaces of a polyethylene film (available from SCK, thickness: 35 μm) through a dip coating process, and vapor induced phase separation was carried out at 23° C. under a relative humidity of 60% to obtain a separator provided with porous coating layers on both surfaces thereof.

EXAMPLE 1-2

A separator was obtained in the same manner as Example 1-1, except that 14 wt % of poly(vinylidene fluoride-co-hexafluoropropylene) (available from Arkema, VDF monomer content:HFP monomer content=98:2) containing 2 wt % of hexafluoropropylene monomer and 98 wt % of vinylidene fluoride monomer, as the first binder polymer, and 14 wt % of polyvinyl alcohol (Sigma-Aldrich) as the second binder polymer was added thereto.

COMPARATIVE EXAMPLE 1-1

A separator was obtained in the same manner as Example 1-1, except that poly(vinylidene fluoride-co-hexafluoropropylene) (available from Arkema, VDF monomer content: HFP monomer content=80:20) containing 20 wt % of hexafluoropropylene monomer and 80 wt % of vinylidene fluoride monomer was used as the first binder polymer.

COMPARATIVE EXAMPLE 1-2

A separator was obtained in the same manner as Example 1-1, except that poly(vinylidene fluoride-co-hexafluoropropylene) was not used but 28 wt % of polyvinyl alcohol (Sigma-Aldrich) was used.

COMPARATIVE EXAMPLE 1-3

A separator was obtained in the same manner as Example 1-1, except that Al(OH)$_3$ (available from Huber, average particle diameter: 800 nm, Mohs hardness: 3.0) was used as inorganic particles.

COMPARATIVE EXAMPLE 1-4

A separator was obtained in the same manner as Example 1-2, except that Al(OH)$_3$ (available from Huber, average particle diameter: 800 nm, Mohs hardness: 3.0) was used as inorganic particles.

COMPARATIVE EXAMPLE 1-5

A separator was obtained in the same manner as Comparative Example 1-1, except that Al(OH)3 (available from Huber, average particle diameter: 800 nm, Mohs hardness: 3.0) was used as inorganic particles.

COMPARATIVE EXAMPLE 1-6

A separator was obtained in the same manner as Comparative Example 1-2, except that Al(OH)$_3$ (available from Huber, average particle diameter: 800 nm, Mohs hardness: 3.0) was used as inorganic particles.

COMPARATIVE EXAMPLE 1-7

A separator was obtained in the same manner as Example 1-1, except that Al$_2$O$_3$ (available from Sumitomo, average particle diameter: 500 nm, Mohs hardness: 9.0) was used as inorganic particles.

COMPARATIVE EXAMPLE 1-8

A separator was obtained in the same manner as Example 1-2, except that Al$_2$O$_3$ (available from Sumitomo, average particle diameter: 500 nm, Mohs hardness: 9.0) was used as inorganic particles.

COMPARATIVE EXAMPLE 1-9

A separator was obtained in the same manner as Comparative Example 1-1, except that Al$_2$O$_3$ (available from Sumitomo, average particle diameter: 500 nm, Mohs hardness: 9.0) was used as inorganic particles.

COMPARATIVE EXAMPLE 1-10

A separator was obtained in the same manner as Comparative Example 1-2, except that Al$_2$O$_3$ (available from Sumitomo, average particle diameter: 500 nm, Mohs hardness: 9.0) was used as inorganic particles.

The following Table 1 shows the composition of the inorganic particles, the binder polymer and the dispersant contained in each of the porous coating layers in the separators according to Examples 1-1 and 1-2 and Comparative Examples 1-1 to 1-10.

TABLE 1

| | Content of inorganic particles (wt %) | PVDF-HFP (ratio of VDF monomer:HFP monomer = 98:2) | PVDF-HFP (ratio of VDF monomer:HFP monomer = 80:20) | Polyvinyl alcohol | Cyano resin |
|---|---|---|---|---|---|
| Ex. 1-1 | 70 | 28 | — | — | 2 |
| Ex. 1-2 | 70 | 14 | — | 14 | 2 |
| Comp. Ex. 1-1 | 70 | — | 28 | — | 2 |
| Comp. Ex. 1-2 | 70 | — | — | 28 | 2 |
| Comp. Ex. 1-3 | 70 | 28 | — | — | 2 |
| Comp. Ex. 1-4 | 70 | 14 | — | 14 | 2 |
| Comp. Ex. 1-5 | 70 | — | 28 | — | 2 |
| Comp. Ex. 1-6 | 70 | — | — | 28 | 2 |
| Comp. Ex. 1-7 | 70 | 28 | — | — | 2 |
| Comp. Ex. 1-8 | 70 | 14 | — | 14 | 2 |
| Comp. Ex. 1-9 | 70 | — | 28 | — | 2 |
| Comp. Ex. 1-10 | 70 | — | — | 28 | 2 |

EXAMPLE 2-1

Manufacture of Positive Electrode

Aluminum foil having a thickness of 12 p.m was prepared as a positive electrode current collector.

Li(Ni$_{0.3}$Mn$_{0.4}$Co$_{0.3}$))O$_2$ as a positive electrode active material, PVDF as a binder and denka black as a conductive material were added to N-methyl-2-pyrrolidone (NMP) as a solvent at a weight ratio of 93:4:3 to prepare slurry for forming a positive electrode active material layer.

The slurry for forming a positive electrode active material layer was coated on both surfaces of the aluminum foil, followed by drying and pressing, to obtain a positive electrode.

Manufacture of Negative Electrode

Copper foil having a thickness of 10 μm was prepared as a negative electrode current collector.

SiO as a negative electrode active material, PVDF as a binder and denka black as a conductive material were added to N-methyl-2-pyrrolidone (NMP) as a solvent at a weight ratio of 97:2:1 to prepare slurry for forming a negative electrode active material layer.

The slurry for forming a negative electrode active material layer was coated on both surfaces of the copper foil, followed by drying and pressing, to obtain a negative electrode.

The separator obtained from Example 1-1 was interposed between the positive electrode and the negative electrode, and a pressure of 6.5 MPa was applied thereto at 70° C. to obtain a lithium secondary battery.

EXAMPLE 2-2

A lithium secondary battery was obtained in the same manner as Example 2-1, except that the separator obtained from Example 1-2 was interposed between the positive electrode and the negative electrode.

COMPARATIVE EXAMPLE 2-1

A lithium secondary battery was obtained in the same manner as Example 2-1, except that the separator obtained from Comparative Example 1-1 was interposed between the positive electrode and the negative electrode.

COMPARATIVE EXAMPLE 2-2

A lithium secondary battery was obtained in the same manner as Example 2-1, except that the separator obtained from Comparative Example 1-2 was interposed between the positive electrode and the negative electrode.

COMPARATIVE EXAMPLE 2-3

A lithium secondary battery was obtained in the same manner as Example 2-1, except that the separator obtained from Comparative Example 1-3 was interposed between the positive electrode and the negative electrode.

COMPARATIVE EXAMPLE 2-4

A lithium secondary battery was obtained in the same manner as Example 2-1, except that the separator obtained from Comparative Example 1-4 was interposed between the positive electrode and the negative electrode.

COMPARATIVE EXAMPLE 2-5

A lithium secondary battery was obtained in the same manner as Example 2-1, except that the separator obtained from Comparative Example 1-5 was interposed between the positive electrode and the negative electrode.

COMPARATIVE EXAMPLE 2-6

A lithium secondary battery was obtained in the same manner as Example 2-1, except that the separator obtained from Comparative Example 1-6 was interposed between the positive electrode and the negative electrode.

COMPARATIVE EXAMPLE 2-7

A lithium secondary battery was obtained in the same manner as Example 2-1, except that the separator obtained from Comparative Example 1-7 was interposed between the positive electrode and the negative electrode.

COMPARATIVE EXAMPLE 2-8

A lithium secondary battery was obtained in the same manner as Example 2-1, except that the separator obtained from Comparative Example 1-8 was interposed between the positive electrode and the negative electrode.

COMPARATIVE EXAMPLE 2-9

A lithium secondary battery was obtained in the same manner as Example 2-1, except that the separator obtained from Comparative Example 1-9 was interposed between the positive electrode and the negative electrode.

COMPARATIVE EXAMPLE 2-10

A lithium secondary battery was obtained in the same manner as Example 2-1, except that the separator obtained from Comparative Example 1-10 was interposed between the positive electrode and the negative electrode.

TEST EXAMPLE 1

Determination of Storage Modulus at 70° C. of Binder Polymer

The storage modulus at 70° C. of the binder polymer (each of the two types of binder polymers, when two types of binder polymers are used) used according to each of Examples 1-1 and 1-2 and Comparative Examples 1-1 to 1-10 was determined by using dynamic mechanical analysis (DMA) under 2 MPa.

A sample was prepared by dissolving the binder polymer used according to each of Examples 1-1 and 1-2 and Comparative Examples 1-1 to 1-10 in acetone, casting the resultant solution onto a glass plate, drying the solution at 80° C. for 12 hours to obtain a film, and cutting the film into a size having a width of 5.3 mm, a length of 3 cm and a thickness of 90 μm. Then, the tensile force of the sample in the longitudinal direction was measured under the conditions of an amplitude of 0.3 mm, temperature of 25-90° C., heating rate of 2° C./min and a frequency of 1 Hz to determine the storage modulus at 70° C.

The results are shown in the following Table 2.

TABLE 2

| | Storage modulus at 70° C. | | |
| --- | --- | --- | --- |
| | PVDF-HFP (ratio of VDF monomer:HFP monomer = 98:2) | PVDF-HFP (ratio of VDF monomer:HFP monomer = 80:20) | Polyvinyl alcohol |
| Ex. 1-1 | 560 | — | — |
| Ex. 1-2 | 560 | — | 10 |
| Comp. Ex. 1-1 | — | 350 | — |
| Comp. Ex. 1-2 | — | — | 10 |
| Comp. Ex. 1-3 | 560 | — | — |
| Comp. Ex. 1-4 | 560 | — | 10 |
| Comp. Ex. 1-5 | — | 350 | — |
| Comp. Ex. 1-6 | — | — | 10 |
| Comp. Ex. 1-7 | 560 | — | — |
| Comp. Ex. 1-8 | 560 | — | 10 |
| Comp. Ex. 1-9 | — | 350 | — |
| Comp. Ex. 1-10 | — | — | 10 |

Figure 1:
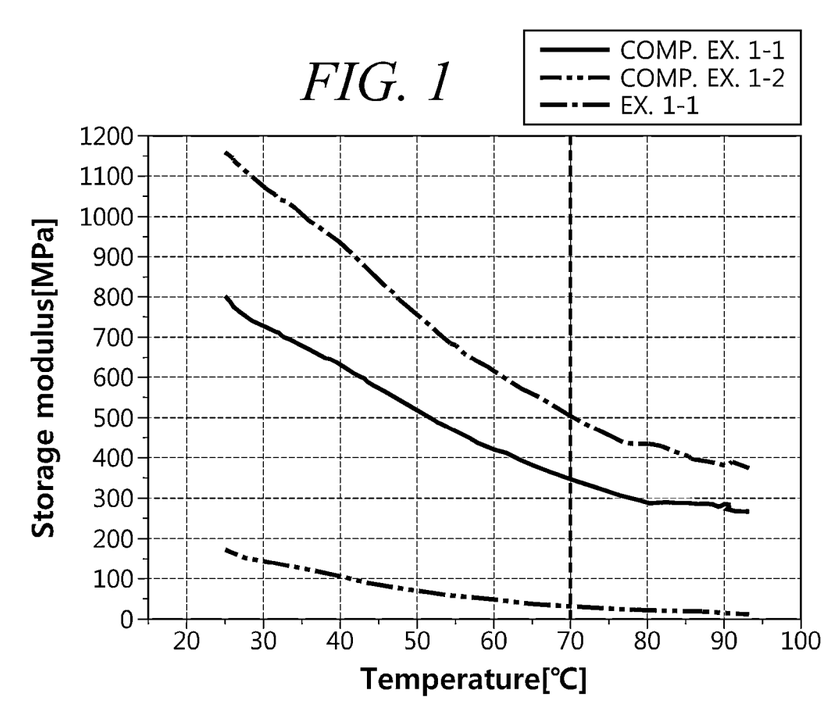
FIG. 1 is a graph illustrating the storage modulus of the binder polymer used according to each of Example 1-1 and Comparative Examples 1-1 and 1-2 depending on a change in temperature.

In addition, the storage modulus of the binder polymer used according to each of Example 1-1 and Comparative Examples 1-1 and 1-2 depending on a change in temperature is shown in FIG. 1.

As can be seen from FIG. 1, the binder polymer used according to Example 1-1 shows a significantly higher storage modulus, as compared to the binder polymers used according to Comparative Examples 1-1 and 1-2.

Particularly, as can be seen from Table 2 and FIG. 1, the binder polymer used according to Example 1-1 shows a storage modulus of 500 MPa or more, while the binder polymers used according to Comparative Examples 1-1 and 1-2 show a storage modulus of less than 500 MPa.

TEST EXAMPLE 2

Determination of Air Permeability, Decrease in Thickness and Adhesion to Electrode of Separator The air permeability and adhesion to an electrode of the separator according to each of Examples 1-1 and 1-2 and Comparative Examples 1-1 to 1-10 were determined. The results are shown in the following Table 3.

In addition, the porous polymer substrate contained in the separator according to each of Examples 1-1 and 1-2 and Comparative Examples 1-1 to 1-10 was determined in terms of a decrease in thickness at 70° C. under 7.4 MPa. The results are shown in the following Table 3.

Determination of Air Permeability

The air permeability (Gurley) of the separator according to each of Examples 1-1 and 1-2 and Comparative Examples 1-1 to 1-10 was determined by using EG01-55-1MR system available from Asahi Seico Co. Herein, the air permeability value is expressed by the time (seconds), i.e. air permeation time, required for 100 cc of air to pass through a section of sample substrate having an area of 1 in$^2$ under a pressure of 12.2 inH$_2$O.

Determination of Decrease in Thickness of Porous Polymer Substrate

The separator according to each of Examples 1-1 and 1-2 and Comparative Examples 1-1 to 1-10 was compressed by using a hot press (QMESYS) at 70° C. under a pressure of 7.4 MPa, washed with acetone, and then determined in terms of a decrease in thickness of the porous polymer substrate contained in the separator. Herein, a PET film was interposed between the separator and the hot press in order to apply pressure uniformly.

Herein, a decrease in thickness of the porous polymer substrate at 70° C. under 7.4 MPa was calculated according to the following formula.

Decrease in thickness of porous polymer substrate at 70° C. under 7.4 MPa=(Initial thickness of porous polymer substrate−Thickness of porous polymer substrate at 70° C. under 7.4 MPa)/ Initial thickness of porous polymer substrate

Determination of Adhesion to Electrode

The separator according to each of Examples 1-1 and 1-2 and Comparative Examples 1-1 to 1-10 was stacked with the negative electrode obtained as described above, and the stack was cut into a width of 25 mm and inserted between PET films having a thickness of 100 pm and adhered by using a flat press. Herein, the flat press was heated and pressurized at 60° C. under a pressure of 6.5 MPa for 1 second. The adhered separator and negative electrode were attached to slide glass by using a double-sided tape. The end portion (10 mm or less from the end of the adhered surface) of the separator was peeled off and attached to a 25 mm×100 mm PET film by using a single-sided tape so that they might be connected in the longitudinal direction.

Then, the slide glass was mounted to the lower holder of a UTM instrument available from Instron Co., and the PET film adhered to the separator was mounted to the upper holder of the UTM instrument. Then, force was applied at 180° and a rate of 300 mm/min. The force required for separating the negative electrode from the separator was measured.

TABLE 3

| | Thickness of porous coating layer (μm) | Loading amount (g/cm$^2$) | Air permeability (s/100 cc) | Decrease in thickness of porous polymer substrate at 70° C. under 7.4 MPa(%) | Adhesion to electrode (gf/25 mm) |
|---|---|---|---|---|---|
| Ex. 1-1 | 3 on both sides | 7.0 | 2154 | 6 | 15 |
| Ex. 1-2 | 3 on both sides | 7.0 | 1158 | 1 | 80 |
| Comp. Ex. 1-1 | 3 on both sides | 7.0 | 1781 | 23 | 7 |
| Comp. Ex. 1-2 | 3 on both sides | 7.0 | 5672 | 30 | 65 |
| Comp. Ex. 1-3 | 3 on both sides | 7.0 | 7425 | 10 | 10 |
| Comp. Ex. 1-4 | 3 on both sides | 7.0 | 10879 | 15 | 55 |
| Comp. Ex. 1-5 | 3 on both sides | 7.0 | 8531 | 28 | 5 |
| Comp. Ex. 1-6 | 3 on both sides | 7.0 | 11651 | 32 | 42 |
| Comp. Ex. 1-7 | 3 on both sides | 7.0 | 2345 | 60 | 14 |
| Comp. Ex. 1-8 | 3 on both sides | 7.0 | 1357 | 50 | 65 |
| Comp. Ex. 1-9 | 3 on both sides | 7.0 | 1978 | 70 | 8 |
| Comp. Ex. 1-10 | 3 on both sides | 7.0 | 6015 | 85 | 50 |

As can be seen from Table 3, the separator according to Example 1-1 includes the first binder polymer having a storage modulus at 70° C. of 500 Mpa or more, and thus shows a significantly low decrease in thickness of the porous polymer substrate of 7% or less at 70° C. under 7.4 MPa, and has excellent air permeability.

The separator according to Example 1-2 includes the first binder polymer having a storage modulus at 70° C. of 500 Mpa or more and further includes the second binder polymer having a storage modulus at 70° C. of 50 MPa or less but imparting adhesion between the porous polymer substrate and the porous coating layer, and thus shows a significantly low decrease in thickness of the porous polymer substrate of 7% or less at 70° C. under 7.4 MPa, and has an air permeability smaller than 2000 s/100 cc, while providing excellent adhesion.

On the contrary, the separator according to Comparative Example 1-1 merely includes a binder polymer having a storage modulus at 70° C. of less than 500 MPa, and thus shows a decrease in thickness of the porous polymer substrate of larger than 7% at 70° C. under 7.4 MPa.

The separator according to Comparative Example 1-2 merely includes a binder polymer having a storage modulus at 70° C. of less than 500 MPa, and thus shows a decrease in thickness of the porous polymer substrate of larger than 7% at 70° C. under 7.4 MPa, and the porous coating layer is compressed to cause blocking of the pores of the porous coating layer, resulting in a significant decrease in air permeability.

Even though each of the separators according to Comparative Examples 1-3 to 1-6 includes the first binder polymer having a storage modulus at 70° C. of 500 MPa or more, the inorganic particles having a Mohs hardness of less than 3.5 cannot absorb the external stress sufficiently, and thus the separator shows a decrease in thickness of the porous polymer substrate of larger than 7%. In addition, it can be seen that the porous coating layer is compressed to cause blocking of the pores of the porous coating layer, resulting in a significant decrease in air permeability.

Even though each of the separators according to Comparative Examples 1-7 to 1-10 includes the first binder polymer having a storage modulus at 70° C. of 500 MPa or more, the inorganic particles having a Mohs hardness of larger than 8.5 cause damages upon the porous polymer substrate itself, and thus the separator shows a decrease in thickness of the porous polymer substrate of larger than 50%.

TEST EXAMPLE 3

SEM Image Analysis of Section of Separator after Lamination Process

The section of each of the lithium secondary batteries according to Example 2-2 and Comparative Example 2-2 was analyzed through the scanning electron microscopic (SEM) images. The results are shown in FIG. 2 and FIG. 3.

Figure 2:
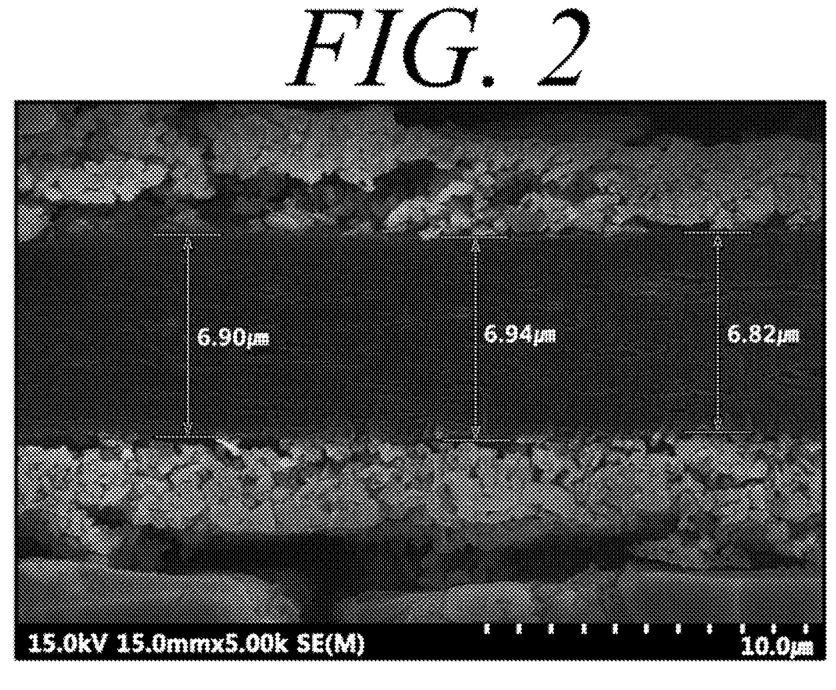
FIG. 2 shows a scanning electron microscopic (SEM) image illustrating the section of the separator in the lithium secondary battery according to Example 2-2.

As can be seen from FIG. 2, in the lithium secondary battery according to Example 2-2, the separator shows little difference in thickness distribution throughout the whole separator.

Figure 3:
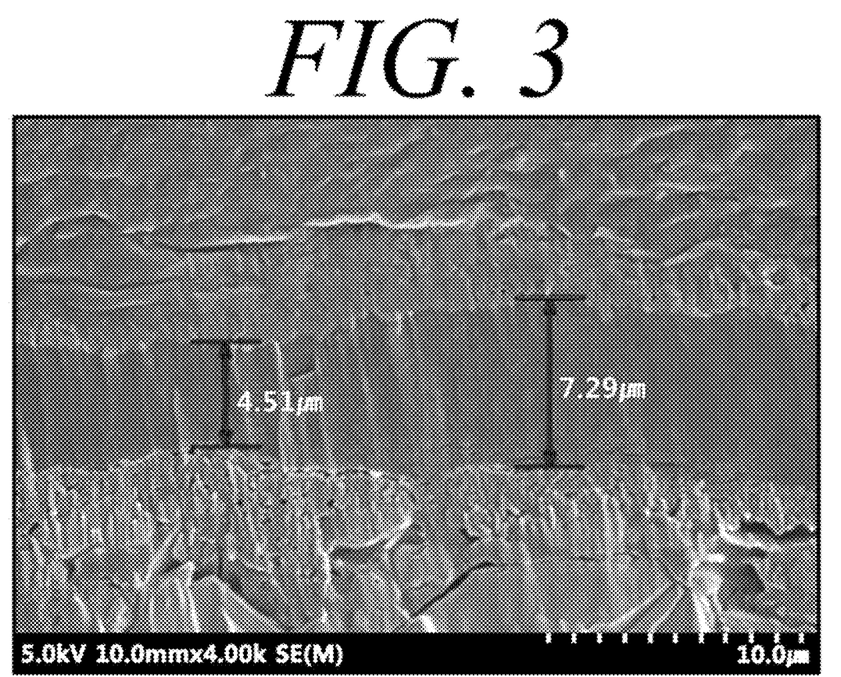
FIG. 3 shows an SEM image illustrating the section of the separator in the lithium secondary battery according to Comparative Example 2-2.

On the contrary, as can be seen from FIG. 3, in the lithium secondary battery according to Comparative Example 2-2, the separator is strongly compressed locally at a portion thereof and shows a significant decrease in thickness.

TEST EXAMPLE 4

Analysis of Life Characteristics of Lithium Secondary Battery

The lithium secondary battery according to each of Example 2-1 and Comparative Example 2-1 was analyzed in terms of cycle life characteristics based on the discharge capacity at 25° C., 0.44 C. The results are shown in the following Table 4.

The lithium secondary battery according to each of Example 2-1 and Comparative Example 2-1 was determined in terms of an increase in resistance at 25° C., SOC 50% for 10 seconds. The results are shown in the following Table 4.

TABLE 4

| Cycle @ 700 C. | Example 2-1 | Comp. Ex. 2-1 |
| --- | --- | --- |
| Capacity retention (%) | 83 | 76 |
| Increase in resistance (%) | 32 | 51 |

As can be seen from Table 4, after carrying out the cycle test, the lithium secondary battery according to Example 2-1 shows a higher capacity retention even after 700 cycles, as compared to the lithium secondary battery according to Comparative Example 2-1.

It can be also seen that the lithium secondary battery according to Example 2-1 shows a significantly lower increase in resistance, as compared to the lithium secondary battery according to Comparative Example 2-1.

What is claimed is:

1. A separator for a lithium secondary battery, comprising:
a porous polymer substrate; and
a porous coating layer on at least one surface of the porous polymer substrate,
wherein the porous coating layer comprises inorganic particles having a Mohs hardness of 3.5 to 8.5 and a binder polymer, and
wherein the binder polymer comprises a first binder polymer having a storage modulus at 70° C. of 500 Mpa or more.

2. The separator for the lithium secondary battery according to claim 1, wherein the inorganic particles comprise at least one of $TiO_2$ and $SiO_2$.

3. The separator for the lithium secondary battery according to claim 1, wherein the first binder polymer comprises at least one of polyvinylidene fluoride-co-hexafluoropropylene containing hexafluoropropylene (HFP) monomers at 1 wt % to 3 wt % and poly(acrylic acid)-co-poly(vinyl alcohol).

4. The separator for the lithium secondary battery according to claim 1, wherein the binder polymer further comprises a second binder polymer having a storage modulus at 70° C. of 50 Mpa or less.

5. The separator for the lithium secondary battery according to claim 4, wherein a weight ratio of the first binder polymer to the second binder polymer is 0.8:1 to 1.2:1.

6. The separator for the lithium secondary battery according to claim 4, wherein the second binder polymer comprises at least one of polyvinylidene fluoride-co-trichloroethylene, polyvinylidene fluoride-co-chlorotrifluoroethylene, polymethyl methacrylate, polyacrylonitrile, polyvinyl pyrrolidone, polyvinyl acetate, polyvinyl alcohol, polyethylene-co-vinyl acetate, polyethylene oxide, cellulose acetate, cellulose acetate butyrate, cellulose acetate propionate, cyanoethyl pullulan, cyanoethyl polyvinylalchol, cyanoethyl cellulose, cyanoethyl sucrose, pullulan, carboxymethyl cellulose, acrylonitrile-styrene-butadiene copolymer, or polyimide.

7. A lithium secondary battery, comprising:
a positive electrode,
a negative electrode, and
a separator interposed between the positive electrode and the negative electrode,
wherein the separator is the separator for the lithium secondary battery as defined in claim 1.

8. The separator for the lithium secondary battery according to claim 1, wherein the porous coating layer further comprises a dispersant.

9. The separator for the lithium secondary battery according to claim 8, wherein the dispersant comprises at least one of a cyano (CN) group-containing cyano resin, carboxymethyl cellulose (CMC), polyacrylic acid (PAA), or polymethacryl acrylate (PMAA).

10. The separator for the lithium secondary battery according to claim 1, wherein the inorganic particles are present in an amount of 20 wt % to 99.9 wt % based on 100 wt % of the porous coating layer.

11. The separator for the lithium secondary battery according to claim 1, wherein the first binder polymer comprises polyvinylidene fluoride-co-hexafluoropropylene containing hexafluoropropylene (HFP) monomers at 1 wt % to 3 wt %.

12. The lithium secondary battery according to claim 7, wherein the separator has a decrease in thickness of 7% or less under a condition of lamination of the electrodes with the separator.

* * * * *